US008292347B1

(12) United States Patent
Drake et al.

(10) Patent No.: US 8,292,347 B1
(45) Date of Patent: Oct. 23, 2012

(54) TRANSPARENT LAMINATED STRUCTURE HAVING PEEL-AWAY FILM LAYERS WITH KEYED FEATURES FOR USE ON WINDSCREENS

(75) Inventors: Reginald J. Drake, Midland, NC (US); Brent W. Barbee, Stanfield, NC (US)

(73) Assignee: VTOL, LLC, Locust, NC (US)

( * ) Notice: Subject to any disclaimer, the term of this patent is extended or adjusted under 35 U.S.C. 154(b) by 0 days.

(21) Appl. No.: 12/904,155

(22) Filed: Oct. 13, 2010

Related U.S. Application Data

(63) Continuation-in-part of application No. 29/345,303, filed on Oct. 13, 2009, and a continuation-in-part of application No. 12/152,150, filed on May 12, 2008, which is a continuation-in-part of application No. 10/909,129, filed on Jul. 30, 2004, now Pat. No. 7,370,903, which is a continuation-in-part of application No. 10/434,771, filed on May 9, 2003, now abandoned.

(60) Provisional application No. 61/251,290, filed on Oct. 13, 2009, provisional application No. 60/379,582, filed on May 10, 2002.

(51) Int. Cl.
*B60J 11/06* (2006.01)

(52) U.S. Cl. ............... 296/95.1; 296/136.02; 428/40.1; 160/370.21; 150/168

(58) Field of Classification Search ............... 296/95.1, 296/136.02, 136.01; 160/370.2; 150/168; 428/40.1, 441
See application file for complete search history.

(56) References Cited

U.S. PATENT DOCUMENTS 5,820,201 A * 10/1998 Jabalee ............... 296/136.02
6,878,425 B1 * 4/2005 Gomes ............... 428/40.1

* cited by examiner

*Primary Examiner* — Joseph Pape
(74) *Attorney, Agent, or Firm* — Gregory R. Everman; Everman Law Firm, P.A.

(57) ABSTRACT

A transparent laminated structure having multiple peel-away laminated film layers for protecting windscreens, particularly windscreens of rotary aircraft, from environmental conditions. The laminated structure includes at least one laminated layer wherein each layer includes a film, a bonding layer on a first major side of the film for releaseably attaching the film to either the windscreen or to an adjacent laminated film layer, optionally a conductive material on a second major side of the film for dissipating electrostatic charging in the laminated structure that may occur due to accumulated precipitation static during aircraft fight, and a hard coat layer for protecting the relatively softer film against abrasion. A keyed removal system is provided simplify determining the number of film layers remaining on the windscreen and to aid in the sequential removal of film layers which become degraded below acceptable levels, thereby exposing a subsequent unblemished film layer.

20 Claims, 10 Drawing Sheets

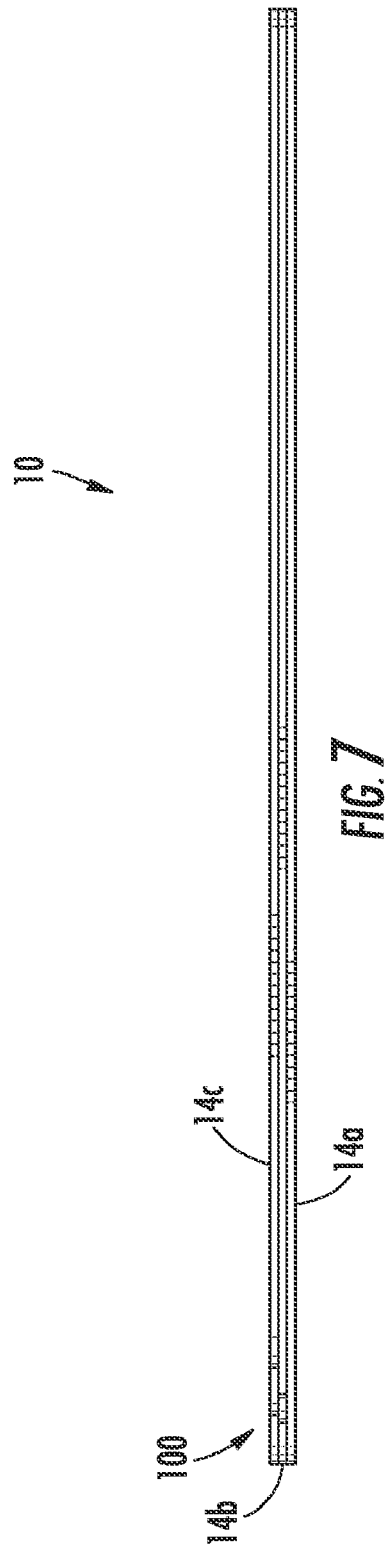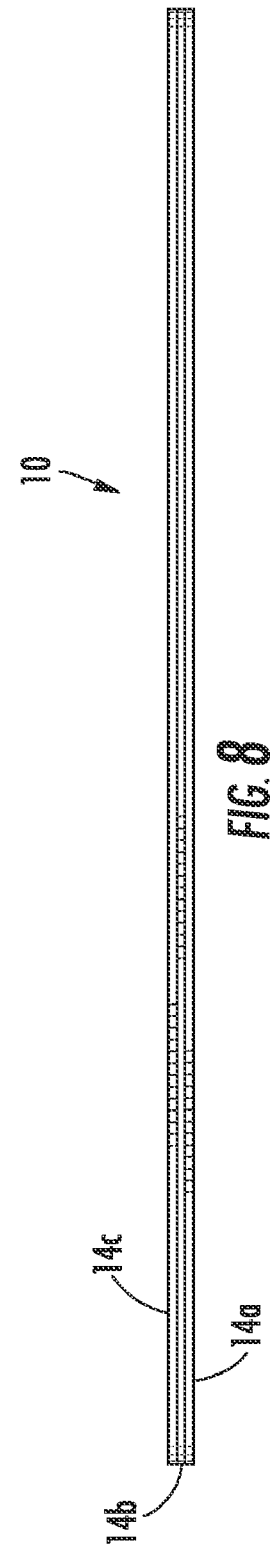

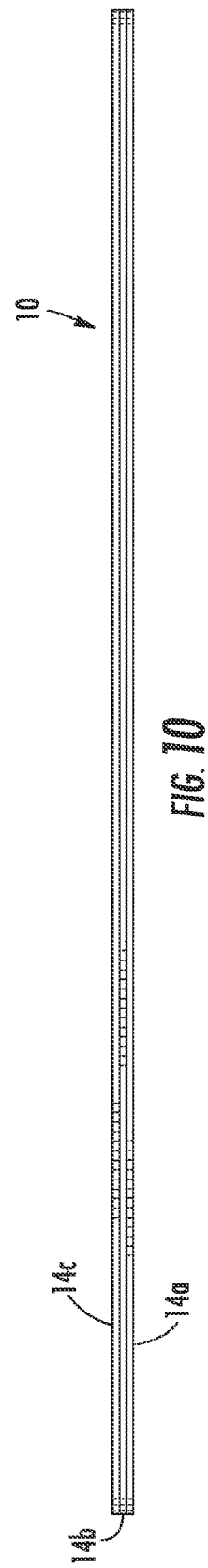

TRANSPARENT LAMINATED STRUCTURE HAVING PEEL-AWAY FILM LAYERS WITH KEYED FEATURES FOR USE ON WINDSCREENS

CROSS REFERENCE TO RELATED APPLICATIONS

This application claims the benefit of U.S. Provisional Application No. 61/251,290, filed Oct. 13, 2009. The application is also a continuation-in-part of U.S. patent application Ser. No. 12/152,150, filed May 12, 2008, which is a continuation-in-part of U.S. patent application Ser. No. 10/909,129, filed Jul. 30, 2004, now U.S. Pat. No. 7,370,903, issued May 13, 2008, which is a continuation-in-part of U.S. patent application Ser. No. 10/434,771, filed May 9, 2003, now abandoned, which claims the benefit of U.S. Provisional Application Ser. No. 60/379,582, filed May 10, 2002. This application is also a continuation-in-part of U.S. Design Patent Application No. 29/345,303, filed Oct. 13, 2009. Each of the above identified applications and patents are incorporated herein by reference in their entirety.

BACKGROUND OF THE INVENTION

1. Field of the Invention

The present invention relates generally to the field of protective coverings for windscreens and, more specifically, to a transparent laminated structure having multiple peel-away film layers for protecting windscreens of rotary aircraft and racing vehicles. The outer film layers have keyed features for aiding in their removal from the underlying film layer.

2. Description of the Related Art

The degradation of aircraft windscreens is a costly problem that also effects safety and mission effectiveness due to distortion of visual and RF electromagnetic wavelengths that pass through a damaged windscreen or sensor window. As such, clarity through aircraft windscreens and sensor windows is imperative for proper operation of an aircraft.

Conventionally, rotary aircraft windscreens and sensor windows are unprotected from environmental damage. As such, the windscreens and sensor windows quickly degrade with scratches and cracks, distorting visible and RF electromagnetic wavelengths that pass there-through. Accordingly, a pilot's or crew member's visibility, his use of night vision goggles, and/or the operation of sensors are impaired which may cause operator error and/or sensor errors, thereby inhibiting mission effectiveness. Additionally, small fissures and defects in the windscreen may be propagated by stress and vibrations during aircraft use, rendering the windscreen entirely unsatisfactory.

The rate of windscreen deterioration is particularly problematic with helicopters, especially those that are performing desert missions since, in addition to blowing sand and debris, the rotor blades of the helicopter and neighboring helicopters can disturb sand and rocks causing a whirlwind of abrasive particles.

Traditionally, various polishes have been used to remove scratches from marred aircraft windscreens. However, the polishing process is not only time consuming, but also may leave swirl marks that dramatically distort the passage of visible and RF electromagnetic wavelengths through the windscreen.

Being that aircraft windscreens are unprotected and the ability to recondition the same is quite limited, aircraft windscreens quickly degrade beyond acceptable standards and require replacement; an expensive and time consuming process.

Although it is know to use multi-layered transparent film in the art of vehicle racing, such as NASCAR®, to extend the useful life of a vehicle's windshield, vehicle windscreens do not face the range of environmental conditions to which aircraft windscreens are subjected. That is, the combination of particulate impacts, rain erosion, wind-shear, arc-over from accumulated precipitation static in the film, light transmission requirements, and film removability without damaging the underlying film layer is unique to application with aircraft.

Accordingly, there is a need in the art for a transparent multi-layered structure having peel-away film layers that is useful in windscreen applications and particularly aircraft windscreen applications. There is also a need in the art for the bonding strength to be sufficient to keep the film layers from delaminating during use, yet be removable as desired without damaging the underlying film or windscreen. A further need is for each film layer to be easily removable, preferably by hand, or with a simple flat edged tool such as a blade. Further yet, there is a need for maintenance personnel to be able to quickly and accurately determine the number of film layers remaining on the windscreen.

BRIEF SUMMARY OF THE INVENTION

To achieve the foregoing and other objects, the present invention, as embodied and broadly described herein, provides various embodiments of a transparent laminated structure having multiple peel-away film layers for protecting windscreens, particularly windscreens of rotary aircraft and vehicles, from environmental conditions.

In a preferred embodiment of the present invention, a transparent laminated structure includes at least one film which has first and second sides. A bonding layer is applied on the first film side for releaseably attaching the film to another film or to a windscreen. A conductive material is applied to the second side of the film for dissipating electrostatic charges within the laminated structure that may be created during aircraft operation. Thus, the conductive material obviates potentially damaging arc-over from the laminated structure to aircraft equipment or personnel. Optionally, the structure may further include a hard coat that is disposed on the conductive material for protecting the relatively softer film against abrasion. As the outermost film becomes degraded below acceptable levels, the film may be easily removed by use of the keyed feature to expose a subsequent unblemished film layer.

In an embodiment, the conductive material may be a conductive oxide or a conductive carbon. Ideally, the conductive material allows for an average electrostatic discharge rate of at least 0.05 kv/second during the period that voltage within the structure is being reduced from 16 kv to 4 kv.

In a preferred embodiment, the laminated structure includes first and second laminated layers, each having a film, a bonding layer that is attached to the respective film, and a conductive material that is attached to the respective film and a hard coat that is attached to the respective conductive material. The second layer includes a keyed feature to assist in the removal of the film. The bonding layer of the first film is adapted for releasably attaching the first laminated layer to a windscreen, such as a windscreen of a rotary aircraft. The bonding layer of the second film releaseably attaches the second film layer to the first film layer.

Optionally, the first and second conductive materials are a conductive oxide or a conductive carbon. As another option, the first film bonding layer has adhesion strength in a range of 1,800 g/in width to 5,000 g/in width and the second film bonding layer has adhesion strength in a range of 180 g/in width to 600 g/in width. In still another option, the laminated structure is sufficiently transparent such that it allows for visible light transmission of at least 85%.

In yet another option, the laminated structure has an average electrostatic dissipation rate of at least 0.05 kv/second during the period that the charge within the structure is reduced from 16 kv to 4 kv.

BRIEF DESCRIPTION OF THE DRAWINGS

The above described and other features, aspects, and advantages of the present invention are better understood when the following detailed description of the invention is read with reference to the accompanying drawings, wherein:

FIG. 7 is a bottom plan view of the transparent laminated structure of FIG. 4;

FIG. 8 is a top plan view of the transparent laminated structure of FIG. 4;

FIG. 9 is a left side elevational view of the transparent laminated structure of FIG. 4;

FIG. 10 is a right elevational view of the transparent laminated structure of FIG. 4;

DETAILED DESCRIPTION OF THE INVENTION

Figure 1:
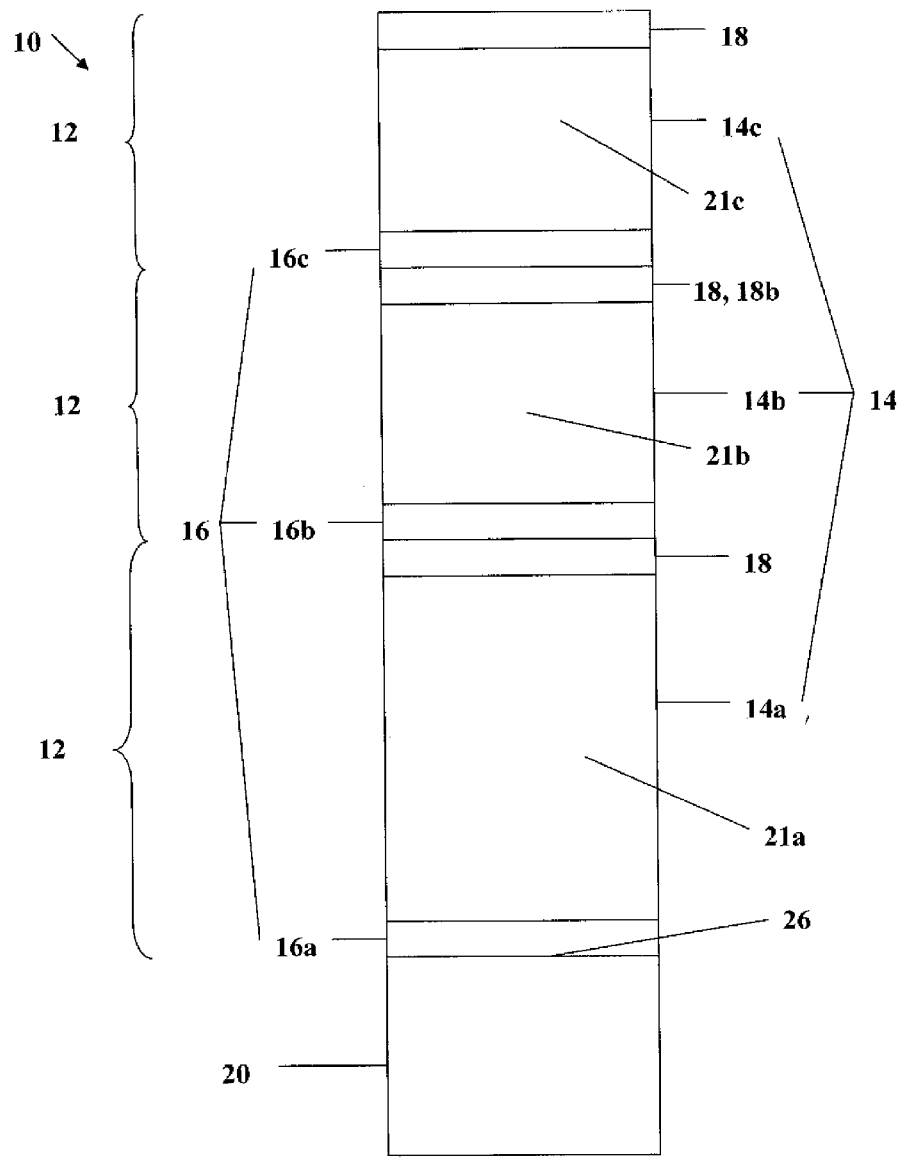
FIG. 1 is an enlarged side view showing a section of the invented transparent laminated structure of FIG. 4, wherein the structure has multiple peel-away laminated film layers for protecting aircraft windscreens in accordance with an exemplary embodiment of the present invention.

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art. As used herein, like reference numbers in different embodiments refer to like elements.

The present invention is a transparent laminated structure having multiple peel-away film layers for protecting windscreens, e.g. aircraft and vehicle windscreens, from environmental effects. The present invention has particular utility with protecting windscreens of rotary aircraft. That is, the laminated structure is uniquely configured to protect such windscreens from the combination of impacts and erosion from blowing sand, particles, stones and rain which could otherwise scratch, mar, soil or damage the windscreen. The film layers are sufficiently bonded in place in order to maintain their position despite being subjected to strong windshear that is associated with the operation of a rotary aircraft, yet are easily removable by thumb-nail or with a flat tool, e.g. pried off with a blade, without damage to an underlying film layer or windscreen. A film removal system having keyed features provides an quick and accurate way for maintenance personnel to determine the number of film layers remaining on the windscreen. Additionally, the structure does not significantly impair visible light transmission there-through and, thus, does not interfere with flight or sensor operation. In some embodiments, the structure can be configured to quickly dissipate electrostatic charge that could otherwise build-up in the structure and arc-over to electrical equipment in the cock-pit. Accordingly, the invented windscreen protector reduces the need for costly and time consuming repair and/or replacement of the windscreen, improve the ability of a maintenance person to quickly determine the number of film layers remaining on the windscreen and simplifies the method to remove damaged windscreens.

In various embodiments, the laminated structure includes multiple peel-away laminated film layers wherein the outermost film layer may, upon becoming degraded, be removed thereby exposing a subsequent unblemished layer. As such, the passage of visible and RF electromagnetic wavelengths through the structure, and accordingly through the windscreen, may be maintained in an acceptable range that does not significantly impair visible and RF electromagnetic wavelengths that pass there-through. As such, optimal pilot visibility, night vision goggle usage and electronic sensors operation may be maintained by simply removing film layers as they become damaged.

As used herein, the term "windscreen" includes windscreens, windows, sensor windows, and the like. The windscreen may be made of any suitable material including plastic, for example polycarbonate or acrylic; glass; or combination thereof. It is also noted that although the present invention has particular utility when used on rotary aircraft, it may be used on windscreens in general including airplane windscreens and automotive windshields.

In various embodiments of the present invention, the transparent laminated structure may further include a conductive material that allows for the structure to quickly dissipate built-up electrostatic charges within the structure. As such, the conductive material reduces the potential of arc-over between the laminated structure and aircraft equipment or personnel.

Referring to the drawings, and particularly to FIG. 1, the present invention is a transparent laminated structure 10 that includes at least one laminated film layer 12, wherein each laminated layer includes a transparent film 14 (14a, 14b, 14c), a bonding layer 16 (16a, 16b, 16c) on a first major side of the film 14 and a hard coat layer 18 on a second major side of the film 14. The present invention may have more or less laminated layers 12 than that shown in the drawings.

The film 14 is transparent, having optical clarity and resistant to distortion once installed on a windscreen 20. The film 14 may be made of glass, plastic or a combination thereof. For example, the film 14 may comprise a polymer including but not limited to those selected from the following broad classifications of materials: polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and blends thereof, for example. In the preferred embodiment, the film 14 is made of a polymeric material such as polyester, and more preferably polyethylene terephtahlata$_6$, due to its suitable properties of toughness, optical clarity, heat formability, high operating temperature range and high tensile strength. An exemplary film is made of Mylar® or Teijin®, each a product of Dupont. Another suitable film is sold under the name Proshield® by Pro-Tint, Inc. of Kannapolis, N.C.

Optionally, the film 14 further comprises stabilizers and fillers that enhance the durability of the film 14 and protect polymer composed items within the aircraft cockpit from exposure to ultraviolet light and/or heat. Additives may also be incorporated into the film 14 that reduce the flammability of the film 14, smoke generation during combustion, or yield other desirable characteristics.

Not to be construed as limiting, it is preferred that each film 14 has a thickness in a range of about 2 mil to 8 mil, so that the films 14 are durable yet manageable. It is also preferred that the cumulative thickness of the films 14 within the laminated structure 10 be in a range of about 4 mil to 20 mil and more preferably in a range of about 11 mil to 20 mil in order to provide energy absorption for the windscreen 20 against stone and debris impact while still allowing for acceptable visible and RF electromagnetic wavelengths to pass therethrough. As the films 14 provide the majority of the laminated structure 10 thickness, the structure 10 likewise has a preferred thickness of about 4 mil to 20 mil, more preferably of about 11 mil to 20 mil.

It is also preferred, for energy absorption, wind-shear and film removal considerations, for the innermost base film 14a to have a greater thickness than the outer films 14b, 14c. That is, thinner outer films 14b, 14c have less perimeter edge surface 21b, 21c (compared to 21a) against which wind-shear forces may react thereby reducing the amount of adhesive bonding force that is needed to maintain the films 14b, 14c from being prematurely removed from the laminated structure 10. As less adhesive force is required, the outer films (14c for example) may be easily peeled off without damaging or loosing the subsequent laminated layer 12.

In a preferred embodiment, the innermost film 14a has a thickness that is in a range of about 6 mil to 8 mil, in order to provide impact resistance, and the outer films 14b, 14c to have a thickness in a range of about 2 mil to 5 mil, in order to reduce wind-shear forces and to ease the removal of the films 14b, 14c once they become deteriorated.

The outer films 14b, 14c are attached to the subsequent laminated layer 12, and the innermost base film 14a to the windscreen 20, by a respective bonding layer 16 having an adhesive. The bonding layers 16 have sufficient bonding strength in order to maintain their respective films 14 from being displaced prematurely due to heat, wind-shear and/or other environmental conditions while still allowing for the outer film (14c for example) to be removed without damaging the hard coat (18b for example) of the subsequent film (14b for example).

The bonding layer 16 may comprise a non-pressure sensitive adhesive or, preferably, a pressure sensitive adhesive. The bonding layer 16 may, for example and not to be construed as limiting, be selected from the broad classifications of acrylics, rubbers, silicons, and polyolefins, and mixtures thereof. In a preferred embodiment, the bonding layer 16a between the base film 14a and the windscreen is either a solvent based acrylic or silicon in order to provide an aggressive bond there-between that is still capable of being overcome in order to allow for the base film 14a to be removed from the windshield 20. And, the bonding layers 16b, 16c between the films 14 are preferably a water based acrylic, to ease removal of the films 14b, 14c as necessary. The bonding layer 16 may optionally further comprise a component selected from the group consisting of tackifiers, oils, stabilizers, flame retardant filler, ultraviolet light absorbers, and ultraviolet light stabilizers, and mixtures thereof, subject to obtain desired properties.

Not to be construed as limiting, the adhesion strength of the bonding layer 16a between the windscreen and the innermost base film 14a is preferably in a range of about 500 g/in width to 5,000 g/in width, more preferably between 900 g/in width to 1,800 g/in width, or between 2,000 g/in width to 3,800 g/in width, depending on the desired application, as measured in accordance with ASTM D3330-96, STANDARD TEST METHOD FOR PEEL ADHESION FOR PRESSURE SENSATIVE TAPE, 2003.

Furthermore, the preferred bonding strength of the bonding layers 16b, 16c between films 14 is in a range of about 150 g/in width to 600 g/in width, more preferably about 180 g/in width to 600 g/in width, even more preferably about 2500 g/in width to 500 g/in width, and most preferably in a range of about 350 g/in width to 5000 g/in width, depending on the application, also as measured in accordance with ASTM D3330-96.

In general, greater bonding strength is desired between the base film 14a and the windscreen 20 as compared to between the films 14 since the shear forces are highest at the innermost bonding layer 18a during flight missions. And, lesser bonding strength is desired between the films 14 so that the outer films (14c for example) may be removed without inadvertently removing the subsequent layer's hard coat (18b for example).

Preferably, at least about 80 percent, more preferably at least about 90 percent, and most preferably about 100 percent, of the first major side of each film 14 has the adhesive bonded thereto in order to maintain the film 14 from being prematurely displaced. It is also preferable that the bonding layer is continuous in order to eliminate air pockets beneath, and bumps in, the adjacent film.

In a preferred embodiment, and not to be construed as limiting, the bonding layer has a thickness ranging from about 25 microns to about 50 microns, and more preferably about 25 microns to about 35 microns. The bonding layer 16 is ideally thin such that it does not significantly affect visible and RF electromagnetic wavelength passage through the laminated structure.

In a preferred embodiment, each laminated layer 12 has a hard coat layer 18 in order to provide abrasion resistance against environmental conditions and, thereby, protect the underlying softer film 14. As it will be appreciated by those skilled in the art, any of the embodiments described herein may be configured without a hard coat layer, however, such a laminated structure would have a shortened life.

The hard coat may be any of several of those know in the art. For example, U.S. Pat. No. 4,478,876 discloses a process for coating a solid substrate such as polycarbonates, polyesters, polymethylmethacrylate, polyacrylates, and polyamides with an abrasion resistant silicone hard coat; U.S. Pat. No.

3,707,397 discloses an organolpolysiloxane hard coat for polycarbonate; U.S. Pat. No. 3,843,390 discloses polyester melamines and acrylic melamine hard coats; and U.S. Pat. No. 2,332,461 discloses allyl resin hard coats. Exemplary hard coats and methods for preparing the same are described in Lotz, Hans-Georg, "Thick optical multi-layered systems on PET Film" Applied Films, Germany, November 2001. In the preferred embodiment, the hard coat layer 18 is silicon based due to its durability and high level of clarity. Suitable hard coats are made by Bekaert of Brussels, Germany under the mark Armorgard™ and Clearshield™. It is noted that ultraviolet stabilizers and/or other stabilizers and fillers may be added to the hard coat in order to obtain desired properties.

A suitable hard coat preferably has a thickness in a range of about 20 nm to 300 nm and more preferably in a range of about 50 nm to 300 nm, although other thicknesses may be used.

An optional primer, as known in the art, may be used to assist having the hard coat layer 18 bond to the film 14. The primer promotes adhesion between the hard coat 18 and the film 14 which may be desirable where there are differences in the coefficient of thermal expansion between the layers 14, 18. Examples of various primers are disclosed in the following U.S. Pat. Nos. 4,313,979; 4,385,463; 4,477,499; 4,559,271; and 5,041,313 wherein the '313 patent is directed to a method for making silicone hard coat composites and primer compositions therefore whereby the primer and hard coat are applied to an aromatic thermoplastic substrate such as polycarbonate. It is noted that ultraviolet stabilizers and/or other stabilizers may be added to the optional primer.

Figure 2:
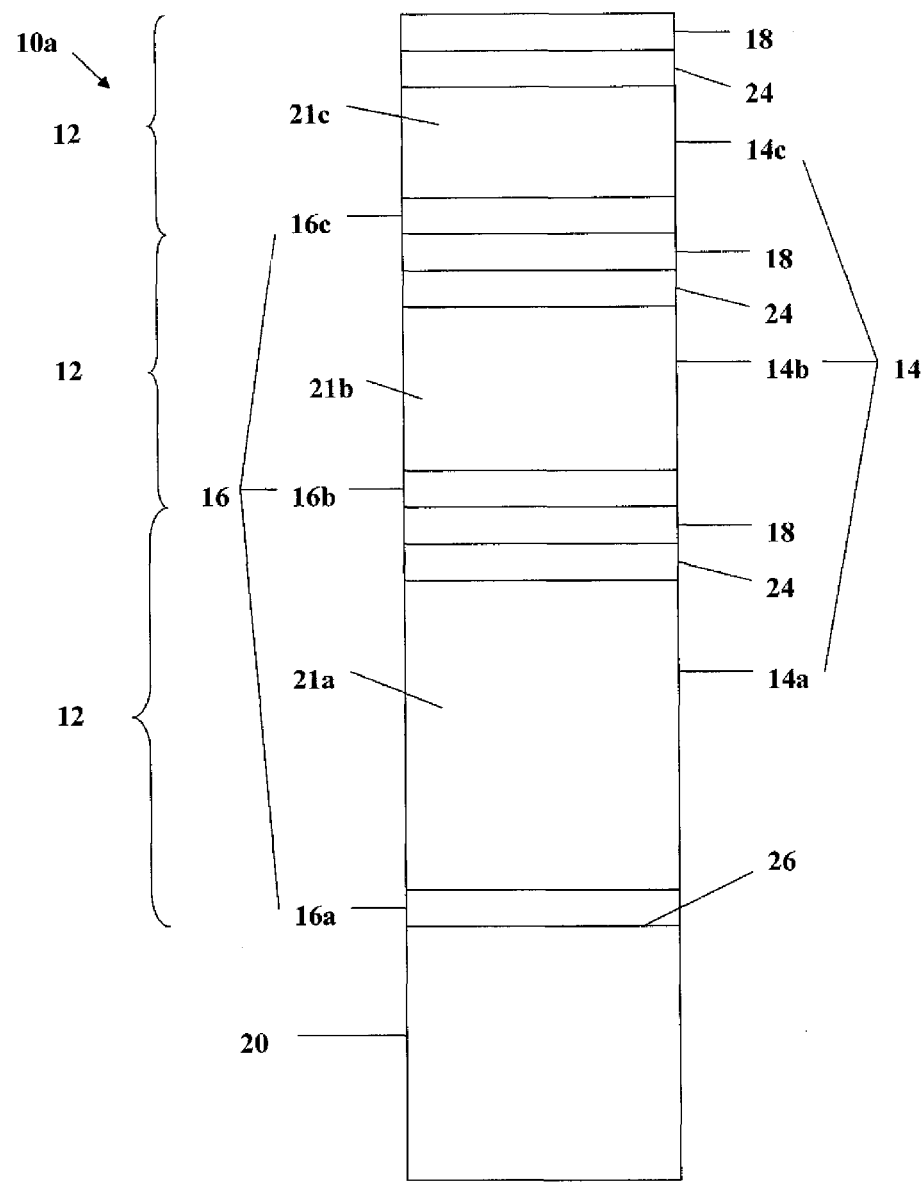
FIG. 2 is an enlarged side view showing a section of an alternative transparent laminated structure similar to that of FIG. 1, but further including conductive material for enhancing electrostatic dissipation from the structure, in accordance with an exemplary embodiment of the present invention.

Referring to FIG. 2, in a preferred embodiment, the laminated structure 10a may optionally include a conductive material 24 disposed on the second major side of the film 14. Aside from the conductive layer, the embodiment illustrated by FIG. 2 has the same configuration as the embodiment of FIG. 1 and, thus, the description of like elements from FIG. 1 are incorporated into the embodiment of FIG. 2. Where the laminated structure 10a also includes a hard coat layer 18, the conductive material 24 is disposed between the film 14 and the hard coat 18. As used herein, the term "conductive material" means any material or substance that is more electrically conductive than the film 14. That is, in a preferred embodiment, the conductive material 24 is more conductive than polyester and, in particular, more conductive than Mylar®.

Without the conductive material 24 (as illustrated by FIG. 1), the film 14 may become highly charged due to precipitation static accumulation during aircraft flight. And, due to the resistivity of the film 14, the charges may not readily travel within the material to create an equilibrium of electrical charges. Therefore, highly charged pockets may be created. These charged pockets may be a shock hazard to personnel and/or equipment if the magnitude of the charge is sustained for a period of time and at a relatively high value. Resulting arcing may cause scaring of the film 14 and possibly cause radio interference. A further problem is that the film 14 may have a capacitive effect whereby if temporary means, such as wiping the outermost film 14c with a grounded conductive glove, is used to discharge the film 14, the film 14 may regain an unacceptable charge due to stored energy therein.

The conductive material 24 enhances electrostatic dissipation of the laminated structure 10a by providing a low impedance path for charges to migrate from the laminated structure 10a to a ground, such as the airframe. In a preferred embodiment and not to be construed as limiting, the average electrostatic dissipation rate from 16 kv to 4 kv is at least 0.02 kv/second, more preferably at least 0.05 kv/second, and most preferably at least 0.10 kv/second.

In a preferred embodiment, the conductive material 24 is a conductive oxide. Examples of conductive oxides include but are not limited to those selected from the following broad classifications of materials: tin oxide, indium oxide, cadmium oxide, gallium oxide, copper oxide and zinc oxide, antimony tin oxide, indium tin oxide, p-type zinc oxide and $ZnO/Al_2O_3$, and mixtures thereof. Most preferably, the conductive material 24 is of indium tin oxide.

The conductive oxide may be applied to the film 14 by any known means. For example, the conductive oxide may be applied to the film 14 by physical vapor deposition.

The conductive oxide is applied and configured so that it does not significantly interfere with the passage of visible or RF electromagnetic wavelengths through the laminated structure 10a. As such, but not limited thereto, it is preferred that the conductive oxide layer have a thickness that is in a range of about 10 nm to 300 nm, and more preferably in a range of about 15 nm to 35 nm.

The conductive oxide may cover only a portion, or, preferably the entirety, of the second major side of the film 14.

Figure 3:
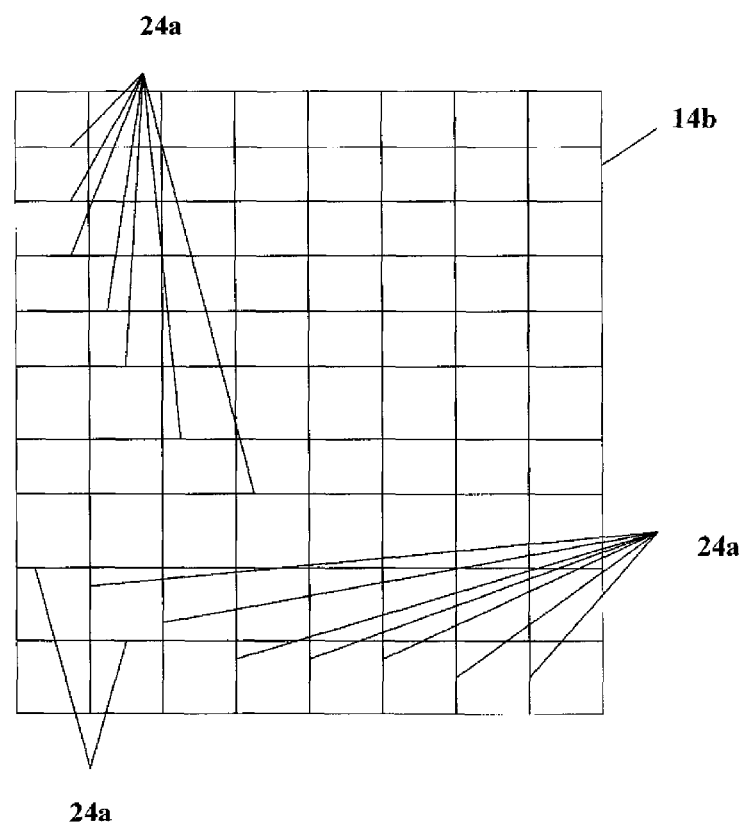
FIG. 3 is an fragmented, enlarged top view of a film within the laminated structure, showing the conductive material as being a conductive carbon, wherein the conductive carbon is disposed in a micro-grid pattern on the film.
Figure 4:
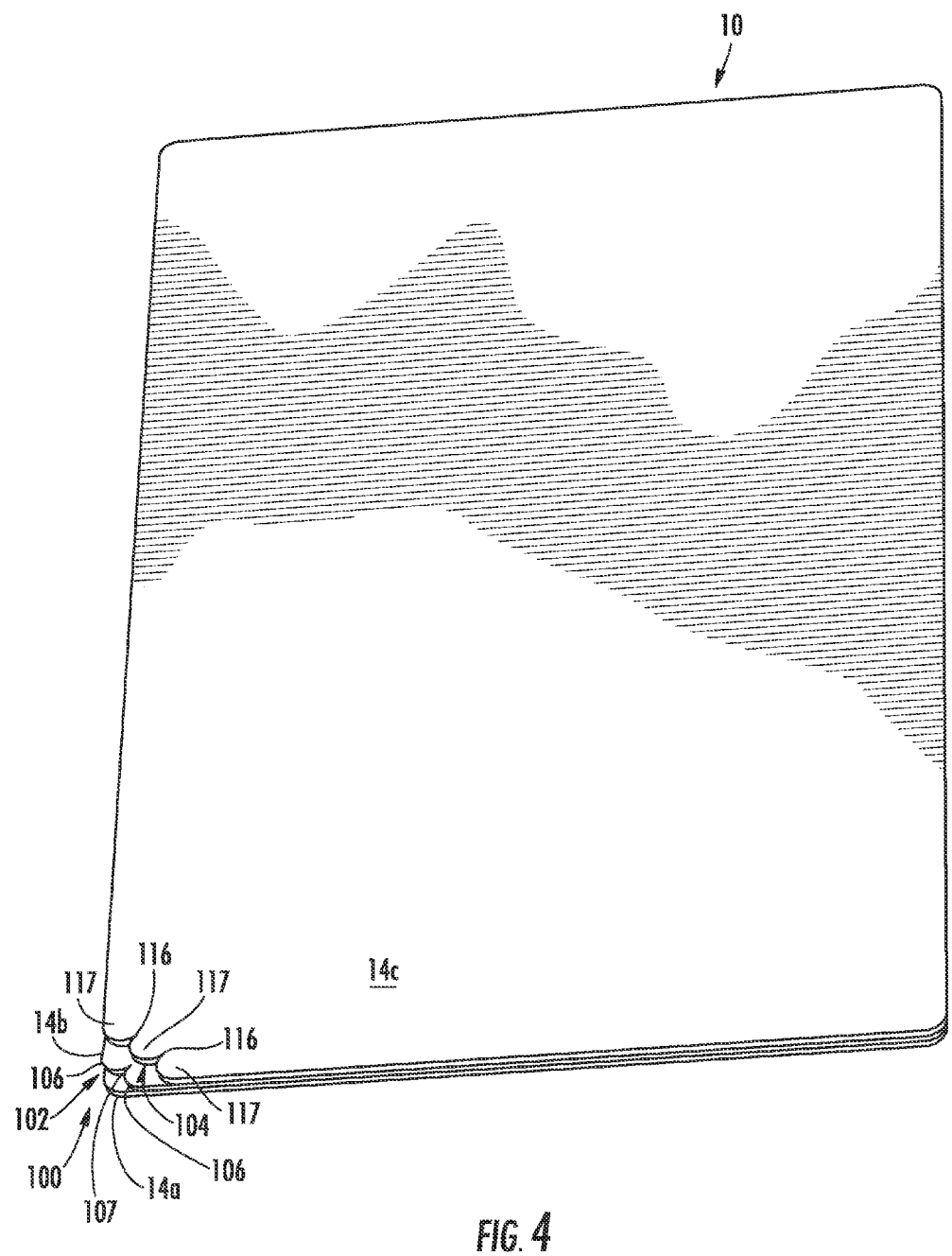
FIG. 4 is a perspective view of the transparent laminated structure having peel-away film layers showing in particular keyed features for aiding in the removal and quantifying of film layers, in according with an embodiment of the present invention.
Figure 5:
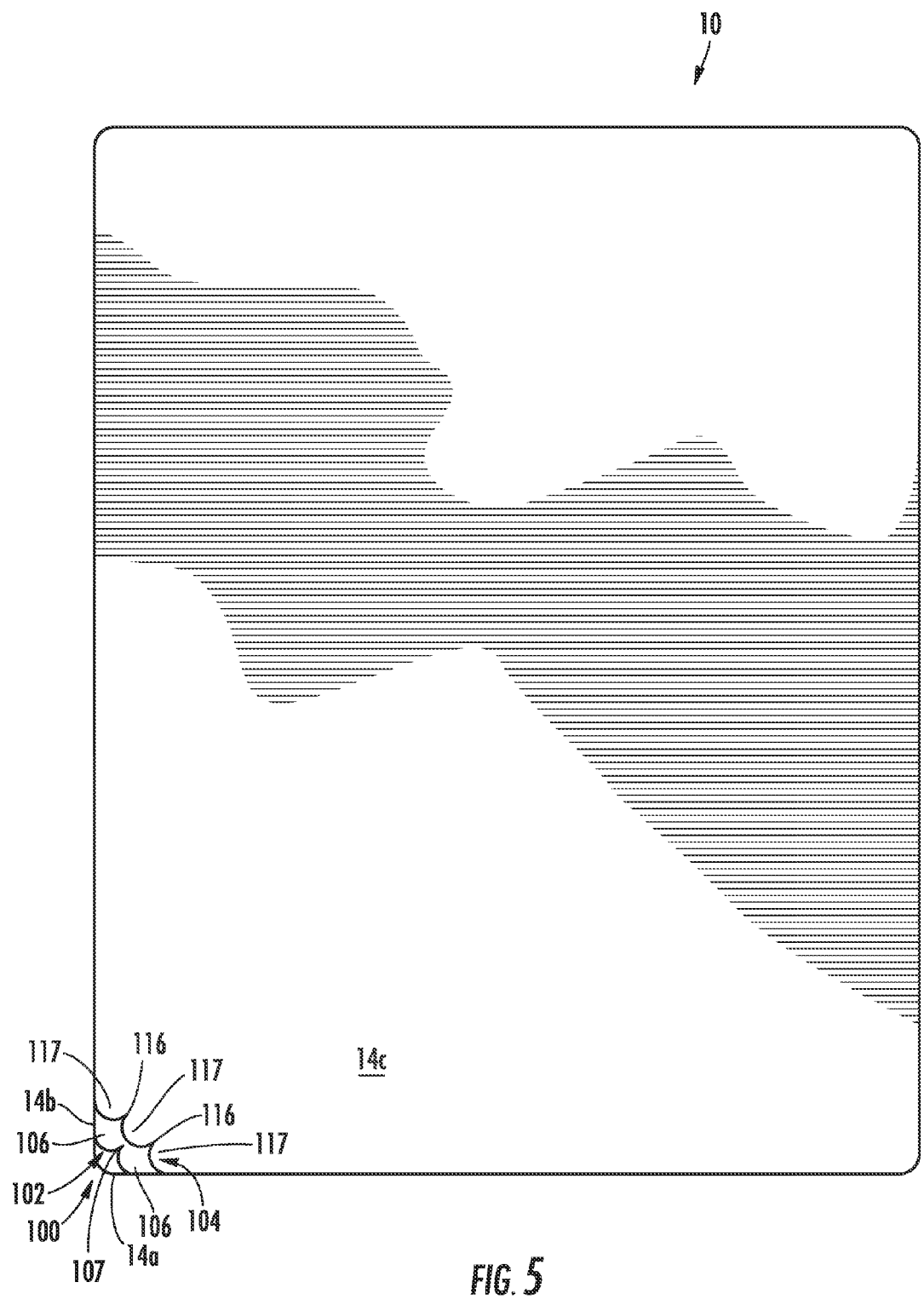
FIG. 5 is a front elevational view of the transparent laminated structure of FIG. 4.
Figure 6:
FIG. 6 is a rear elevational view of the transparent laminated structure of FIG. 4.
Figure 11:
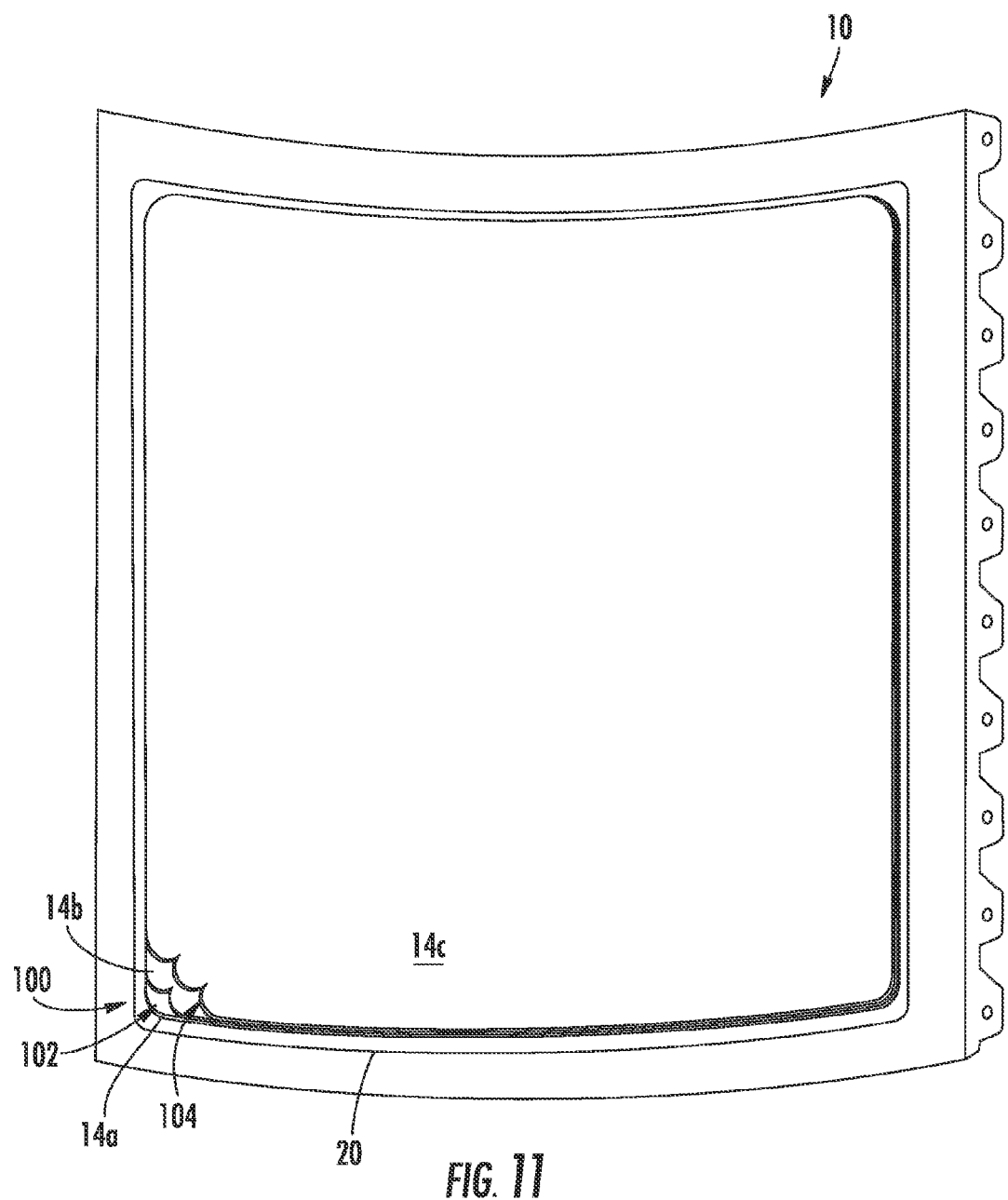
FIG. 11 is a perspective view of the transparent laminated structure of FIG. 4, shown in its environmental use attached to a windscreen.
Figure 12:
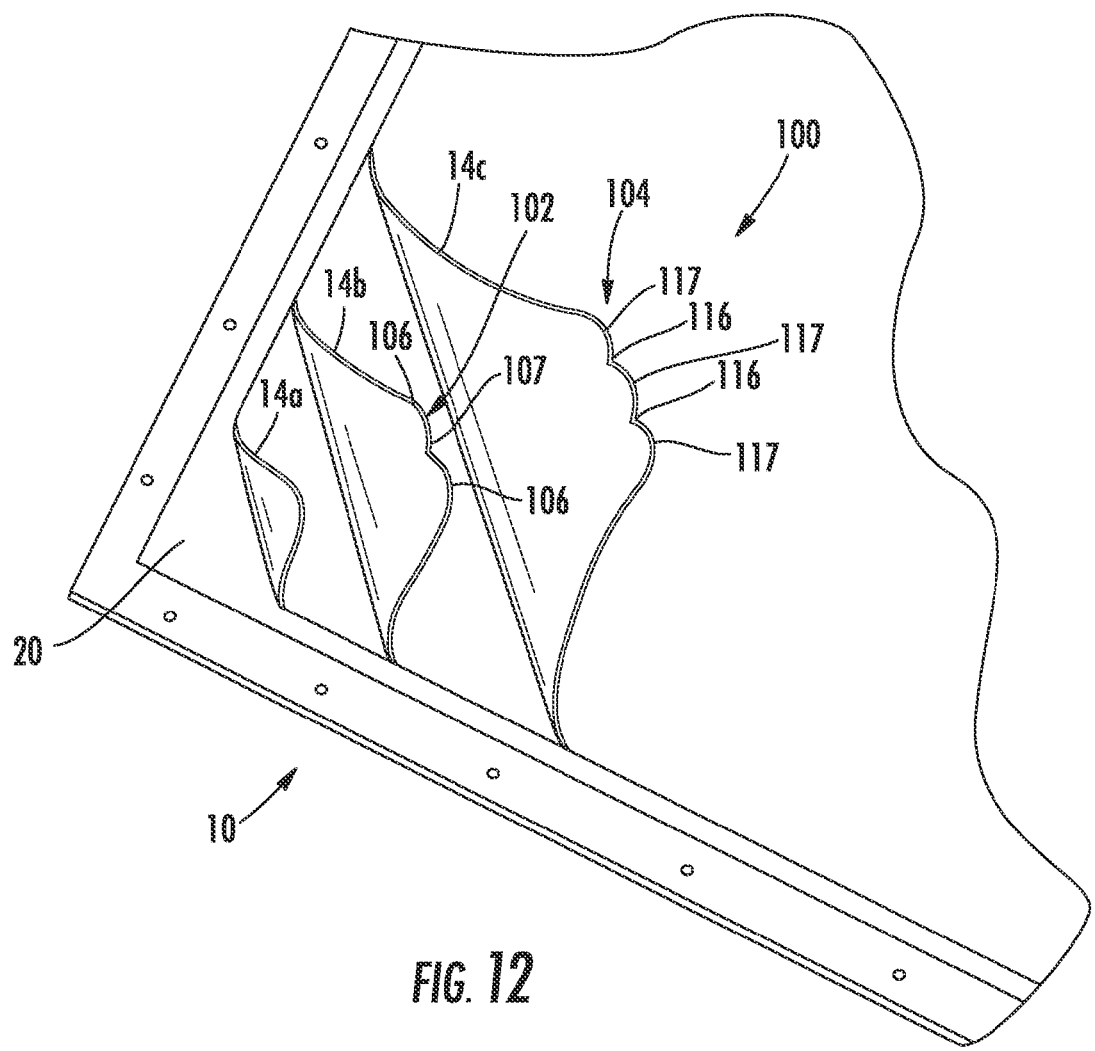
FIG. 12 is a perspective view of the transparent laminated structure of FIG. 4, shown in its environmental use as attached to a windscreen and further illustrating the keyed features of the film layers being peeled back for removal of respective film layers.

In another embodiment, the conductive material may be a conductive carbon that is applied to the second major side of the film 14. As excessive conductive carbon may interfere with visible and RF electromagnetic wavelengths through the laminated structure, the conductive carbon is formed on the film 14 in a random or pre-determined micro-grid pattern. FIG. 3 is a top view of the film (14b for example) illustrating the concept of a micro-grid pattern of conductive carbon 24a. As it will be appreciate by this skilled in the art, the shown thickness of the conductive carbon 24a strands are greatly magnified in order to make the strands visible in the drawings. As applied in the field, the micro-strands must be sufficiently thin such that they do not significantly interfere with the passage of visible and RF wavelengths through the laminated structure, as defined below. And, the number of strands and the pattern of the strands may vary from that shown.

In yet another embodiment (not shown), the conductive material may comprise micro and/or nano conductive threads and/or wires that are applied to the second major side of the film 14 in a pattern.

For each of the described embodiments that included a conductive material, an optional grounding mechanism (not shown) may be provided around the perimeter of the laminated structure in order to provide a low impedance path for the charge to migrate from the laminated structure to the airframe.

For example, the grounding mechanism may be a conductive tape that is attached to the perimeter of the laminated structure. As another example, the grounding mechanism may be a conductive carbon band that is provided around the perimeter of the laminated structure.

In the various described embodiments, the laminated structure does not significantly impair visible or RF electromagnetic wavelengths. As used herein, "does not significantly impair" means that visible light transmission through the laminated structure is preferably at least 75%, more preferably at least 85%, and more preferably at least 89%, as measured in accordance with ASTM D1003, STANDARD TEST METHOD FOR HAZE AND LUMINOUS TRANSMITTANCE OF TRANSPARENT PLASTICS, 2003.

In each of the previously described embodiments, the laminated structure may be provided with a film removal system 100 which is useful in identifying the number of films 14a, 14b, 14c remaining in the structure 10 and for individually removing the outermost film from (14a, 14b or 14c) the laminated structure 10, as illustrated in FIGS. 4-11. The film removal system 100 includes keyed features 102, 104 provided in the films 14b, 14c, other than the base film 14a. The keyed features 102, 104 are bonded to the underlying films, in the same manner as described with regards to the film layers being bonded together, so that the keyed features 102, 104 are not free moving whereby the could otherwise become torn or cause premature delamination during use.

The base film 14a is sized and shaped to properly fit the windscreen 20, i.e. typically in generally rectangular shape, in a customary fashion and does not include a keyed feature.

The second film 14b (intermediate film) is typically coextensive with the second major side of the of the base film 14a, except for a cut-out portion at the corner of the second film 14a whereat a portion of the base film 14a, i.e. a corner, is exposed to the environment. In this manner, the corner of the second film 14b is configured as a recessed keyed feature 102 such that the underlying base film 14a extends beyond the keyed feature 102.

The keyed feature 102 includes two projected features 106 with a recess 107 there-between, generally comprising an "m" shape. The projected features 106 preferably are semi-circular, forming a double-arced perimeter edge with the v-shaped recess 107 in between such that a person can visually, or by touch, determine that there are two projected features 106. These two features 106 identify that the particular film 14b is the second layer of the laminated structure 10.

The third film 14c (outermost film in the Figures) is typically coextensive with the second major side of the second film 14b, except for a cut-out portion at the corner of the third film 14c whereat a portion of the second film 14b, i.e. its keyed feature 102, is exposed to the environment. In this manner, the corner of the third film 14c is configured as a recessed keyed feature 104 such that the keyed feature 102 of the underlying second film 14b extends beyond keyed feature 104 of the third film 14c.

The keyed feature 104 includes three projected features 117 with recesses 116 between the features 117. The projected features 117 preferably are semi-circular, forming a triple-arced perimeter edge with the two v-shaped recesses 116 in between such that a person can visually, or by touch, determine that there are three projected features 117. These three features 117 identify that the particular film 14c is the third layer of the laminated structure 10. This pattern of adding a projected feature 117 and recess 116 may be continued for each subsequent layer so that it may be determined which film layer is currently positioned on the exterior of the laminated structure. It is to be understood by that skilled in the art the keyed feature 102, 104 may have other configurations such as, for example, the projected keyed features 106, 117 may be triangularly shape.

During removal of a degrading film, maintenance personnel may observe, or feel with his hand, the number of projection features on the outermost film to determine how many film layers are on the windscreen. Accordingly, the person may quickly and simply estimate operational-life remaining on the current laminated structure or determine whether a new laminated structure needs to be applied to the windscreen. Should the outermost film be deteriorated, the person may remove the damaged film by placing his thumbnail or a thin tool such as a blade on top of the hardcoat of the subsequent film where it is exposed. The thumbnail or blade is then slid along the hardcoat, and under the outermost film, thereby loosening the corner having the keyed features. The person may then grasps the loosened corner and manually peel the outermost film layer from the laminated structure, thereby exposing a clean film layer.

As the innermost base film 14a may be held in place by a substantial bonding force, it may be desirable to cut the film 14a into strips, then removing the film 14a in sections. Nevertheless, the base film 14a may still be removed by a person inserting their thumbnail or a blade between the film 14a and windscreen, thereby loosening a corner for manually peeling away the film 14a.

Not to be construed as limiting, in the various embodiments described herein it is preferred that the transparent laminated structure 10, 10a (and, therefore, the innermost base film 14a) be bonded to (i.e. protects) about at least 80%, more preferably at least 90%, and most preferably about 100% of the exterior surface 26 of the windscreen 20 when properly installed on the windscreen 20.

The foregoing provides a detailed description of exemplary embodiments of the present invention. Although specific embodiments of a transparent laminated structure having multiple peel-away film layers with keyed features for protecting windscreens have been described with reference to preferred embodiments and examples thereof, other embodiments and examples may perform similar functions and/or achieve similar results. All such equivalent embodiments and examples are within the spirit and scope of the present invention and are intended to be covered by the following claims.

That which is claimed is:

1. A transparent structure for use with a windscreen, comprising:
    a first layer including a film having a first major side, a second major side, a thickness and a perimeter edge surface; a bonding layer disposed on the first major side of said film for releaseably attaching said first layer to the windscreen; and a hard coat disposed on the second major side of said film;
    at least one second layer, each of said at least one second layer including a film having a first major side, a second major side, a thickness and a perimeter edge surface; a bonding layer disposed on the first major side of said at least one second layer film that releaseably attaches said at least one second layer to either another of said at least one second layer or said first layer; and a hard coat disposed on the second major side of said at least one second layer film;
    wherein the perimeter edge surface of each of said at least one second layer film, against which wind-shear force may react, is less than the perimeter edge surface of said first layer film; and
    wherein each of said at least one second layer includes a keyed feature that allow for a person to determine the number of layers remaining in said structure.

2. The transparent structure in accordance with claim 1 wherein each of said at least one second layer film is thinner than said first layer film.

3. The transparent structure in accordance with claim 1 wherein said first layer film has a thickness in a range of about 6 mil to 8 mil and each of said at least one second layer film has a thickness in a range of 2 mil to 5 mil.

4. The transparent structure in accordance with claim 3 wherein said transparent structure has a thickness in a range of about 11 mil to 20 mil.

5. The transparent structure in accordance with claim 4 wherein visible light transmission through said transparent structure is at least 89% as measured in accordance with ASTM D1003, STANDARD TEST METHOD FOR HAZE AND LUMINOUS TRANSMITTANCE OF TRANSPARENT PLASTICS, 2003.

6. The transparent structure in accordance with claim 1 wherein said bonding layer of said first layer has a greater bonding strength than that of said bonding layer of each of said at least one second layer.

7. The transparent structure in accordance with claim 6 wherein said bonding layer of said first layer is in a range of about 500 g/in width to 5,000 g/in width and said bonding layer of each of said at least one second layer is a range of about 150 g/in width to less than 600 g/in width, as measured in accordance with ASTM D3330-96 STANDARD TEST METHOD FOR PEEL ADHESION FOR PRESSURE SENSATIVE TAPE, 2003.

8. A transparent structure for use with a windscreen, comprising:
    a first layer including a film having a first major side and a second major side, a bonding layer disposed on the first major side of said film for releaseably attaching said first layer to the windscreen, and a hard coat disposed on the second major side of said film;
    at least one second layer, each of said at least one second layer including a film having a first major side and a second major side, a bonding layer disposed on the first major side of said at least one second layer film that releaseably attaches said at least one second layer to either another of said at least one second layer or said first layer, and a hard coat disposed on the second major side of said at least one second layer film;
    wherein said bonding layer of said first layer has a greater bonding strength than that of said bonding layer of each of said at least one second layer; and
    wherein each of said at least one second layer includes a keyed feature that allow for a person to determine the number of layers remaining in said structure.

9. The transparent structure in accordance with claim 8 wherein said bonding layer of said first layer is in a range of about 500 g/in width to 5,000 g/in width and said bonding layer of each of said at least one second layer is a range of about 150 g/in width to 600 g/in width, as measured in accordance with ASTM D3330-96 STANDARD TEST METHOD FOR PEEL ADHESION FOR PRESSURE SENSATIVE TAPE, 2003.

10. The transparent structure in accordance with claim 9 wherein at least about 80 percent of said first major side of said first layer film has said bonding layer bonded thereto so that said first layer film is maintained from being prematurely displaced from said windscreen.

11. The transparent structure in accordance with claim 9 wherein at least about 100 percent of said first major side of said first layer film has said bonding layer bonded thereto so that said first layer film is maintained from being prematurely displaced from said windscreen.

12. The transparent structure in accordance with claim 9, wherein visible light transmission through said transparent structure is at least 89% as measured in accordance with ASTM D1003, STANDARD TEST METHOD FOR HAZE AND LUMINOUS TRANSMITTANCE OF TRANSPARENT PLASTICS, 2003.

13. The transparent structure in accordance with claim 8 wherein said bonding layer of said first layer is in a range of about 2,000 g/in width to 3,800 g/in width and said bonding layer of each of said at least one second layer is a range of about 180 g/in width to 600 g/in width, as measured in accordance with ASTM D3330-96 STANDARD TEST METHOD FOR PEEL ADHESION FOR PRESSURE SENSATIVE TAPE, 2003.

14. The transparent structure in accordance with claim 8 wherein said bonding layer of said first layer is in a range of about 900 g/in width to 1,800 g/in width and said bonding layer of each of said at least one second layer is a range of about 350 g/in width to 500 g/in width, as measured in accordance with ASTM D3330-96 STANDARD TEST METHOD FOR PEEL ADHESION FOR PRESSURE SENSATIVE TAPE, 2003.

15. A transparent laminated structure for use with a windscreen, comprising:
    a first laminated layer, including
        a first film,
        a first bonding layer for maintaining said first film from being prematurely displaced from said windscreen, wherein said bonding layer allows for said first film to be selectively removed from said windscreen without damaging said windscreen, and
        a first hard coat attached to, and being harder than, said first film for protecting said first film from being damaged by the environment;
    a second laminated layer having a keyed feature, including
        a second film,
        a second bonding layer for maintaining said second film from being prematurely displaced from said first laminated layer, wherein said second bonding layer allows for said second film to be selectively removed from said first laminated layer without damaging said first laminated layer, and
        a second hard coat attached to, and being harder than, said second film for protecting said second film from being damaged by the environment;
    wherein said first bonding layer has a greater bonding strength than said second bonding layer; and
    wherein said first film is exposed at said keyed feature.

16. The structure in accordance with claim 15 wherein said first bonding layer has a bonding strength in a range of about 500 g/in width to 5,000 g/in width and said second bonding layer has a bonding strength in a range of about 150 g/in width to 600 g/in width.

17. The structure in accordance with claim 15 wherein said first film has a thickness that is greater than a thickness of said second film.

18. The structure in accordance with claim 15 wherein said first film has a thickness in a range of about 6 mil to 8 mil and said second film has a thickness in a range of about 2 mil to 5 mil.

19. The structure in accordance with claim 15, wherein visible light transmission through said structure is at least 85% as measured in accordance with ASTM D1003, STANDARD TEST METHOD FOR HAZE AND LUMINOUS TRANSMITTANCE OF TRANSPARENT PLASTICS, 2003.

20. The structure in accordance with claim 15 wherein said first bonding layer has a bonding strength in a range of about 2,000 g/in width to 3,800 g/in width, said second bonding layer has a bonding strength in a range of about 150 g/in width to 600 g/in width, said first film has a thickness in the range of about 6 mil to 8 mil and said second film has a thickness in the range of about 2 mil to 5 mil, visible light transmission through said structure is at least 85% as measured in accordance with ASTM D1003, STANDARD TEST METHOD FOR HAZE AND LUMINOUS TRANSMITTANCE OF TRANSPARENT PLASTICS, 2003, wherein said windscreen is a rotary aircraft windscreen and wherein said first film is bonded to and protects at least 90% of an exterior surface of said rotary aircraft windscreen.

* * * * *